United States Patent [19]

Angott

[11] Patent Number: 4,684,822

[45] Date of Patent: Aug. 4, 1987

[54] LAMP DIMMER CIRCUIT

[76] Inventor: Paul G. Angott, 475 Hurst, Troy, Mich. 48098

[21] Appl. No.: 827,362

[22] Filed: Feb. 7, 1986

[51] Int. Cl.$^4$ ............................................... H02B 1/24
[52] U.S. Cl. .................... 307/125; 307/114; 307/115; 340/310 A; 340/825.69; 340/825.72; 315/158
[58] Field of Search ............... 307/114, 115, 116, 117, 307/125; 340/310 R, 310 A, 310 CP, 307, 332, 780, 696, 825.71, 825.72, 696, 825.69, 825.8, 825.07, 825.23, 825.24, 825.29; 455/2, 4, 5, 68, 77, 6, 130, 91, 92; 315/149, 150, 154, 155, 157, 158, 159; 367/117, 135, 137, 903; 375/75, 59, 65, 66, 69

[56] References Cited

U.S. PATENT DOCUMENTS

| | | | |
|---|---|---|---|
| 4,072,898 | 2/1978 | Hellman et al. | 340/825.69 X |
| 4,135,116 | 1/1979 | Smith | 315/158 |
| 4,277,727 | 7/1981 | LeVert | 315/159 X |
| 4,355,309 | 10/1982 | Hughey et al. | 340/825.69 X |
| 4,464,606 | 8/1984 | Kane | 315/158 |
| 4,467,246 | 8/1984 | Tanaka et al. | 315/158 |
| 4,538,973 | 9/1985 | Angott et al. | 340/825.69 X |
| 4,590,471 | 5/1986 | Pieroway et al. | 340/825.69 |

Primary Examiner—William M. Shoop, Jr.
Assistant Examiner—Shik Luen Paul Ip
Attorney, Agent, or Firm—Reising, Ethington, Barnard, Perry & Milton

[57] ABSTRACT

A remotely controlled electrical dimmer circuit (10) for supplying power to an electrical load (18) required power from a constant source comprises a radio signal receiver (14) for receiving a predetermined radio signal from a transmitter (12). The receiver (14) includes a super-generative detector (16) for receiving the predetermined radio signal. An amplifier filter (20) amplifies and filters the signal from the detector (16). A counter (50) triggers a triac (T1) to open and close the circuit (10) in response to a first duration of the predetermined radio signal. The counter (50) also decreases and increases the power supply to the electrical load (18) in a series of stepped levels in response to a second duration of the predetermined radio signal.

12 Claims, 2 Drawing Figures

LAMP DIMMER CIRCUIT

TECHNICAL FIELD

The subject invention relates to remotely controlled dimmer switches and, particularly, remotely controlled dimmer switches utilized with a lamp.

BACKGROUND ART

Dimmer switches are extensively utilized in devices requiring a variable amount of power. This is typically accomplished by either a manual potentiometer switch that is manually turned by the operator, or remotely controlled circuit. In the remotely controlled circuit, a counter counts the number of pulses to activate a series of relays to vary the amount of power delivered.

The operator is required to be at the location of the switch for the manual potentiometer switch. In the case of the remotely controlled circuit, the variability of the dimmer switch depends on the number of relays contained in the circuit. Further, the counter cannot be controlled by the operator based on the transmitted signal.

STATEMENT OF THE INVENTION AND ADVANTAGES

The invention includes a remotely controlled electrical dimmer circuit for supplying power to an electrical load requiring electrical power from a constant source. A radio signal receiver means electrically supplies power in response to a predetermined radio siganl. The radio signal receiver means includes a super-generative detector for receiving the predetermined radio signal and amplifier filter means for amplifying the predetermined radio signal. Further, the radio signal receiver means includes switch means for opening and closing the circuit in response to a first duration of the predetermined radio signal for supplying power to the electrical load and for decreasing and increasing the power supply to the electrical load in a series of stepped levels in response to a second duration of the predetermined radio signal.

Accordingly, a device using the subject invention can be remotely controlled from any location, increasing the mobility of the operator. Also, the switch is controlled by the operator in response to the duration of the predetermined radio signal, preventing the switch from being activated by an incorrectly or inappropriately transmitted signal.

FIGURES IN THE DRAWINGS

Other advantages of the present invention will be readily appreciated as the same becomes better understood by reference to the following detailed description when considered in connection with the accompanying drawings wherein:

FIG. 1 is a schematic of the receiver portion of a preferred circuit of the subject invention; and FIG. 2 is a schematic of a preferred transmitter circuit of the subject invention.

DESCRIPTION OF THE PREFERRED EMBODIMENT

Figure 1:
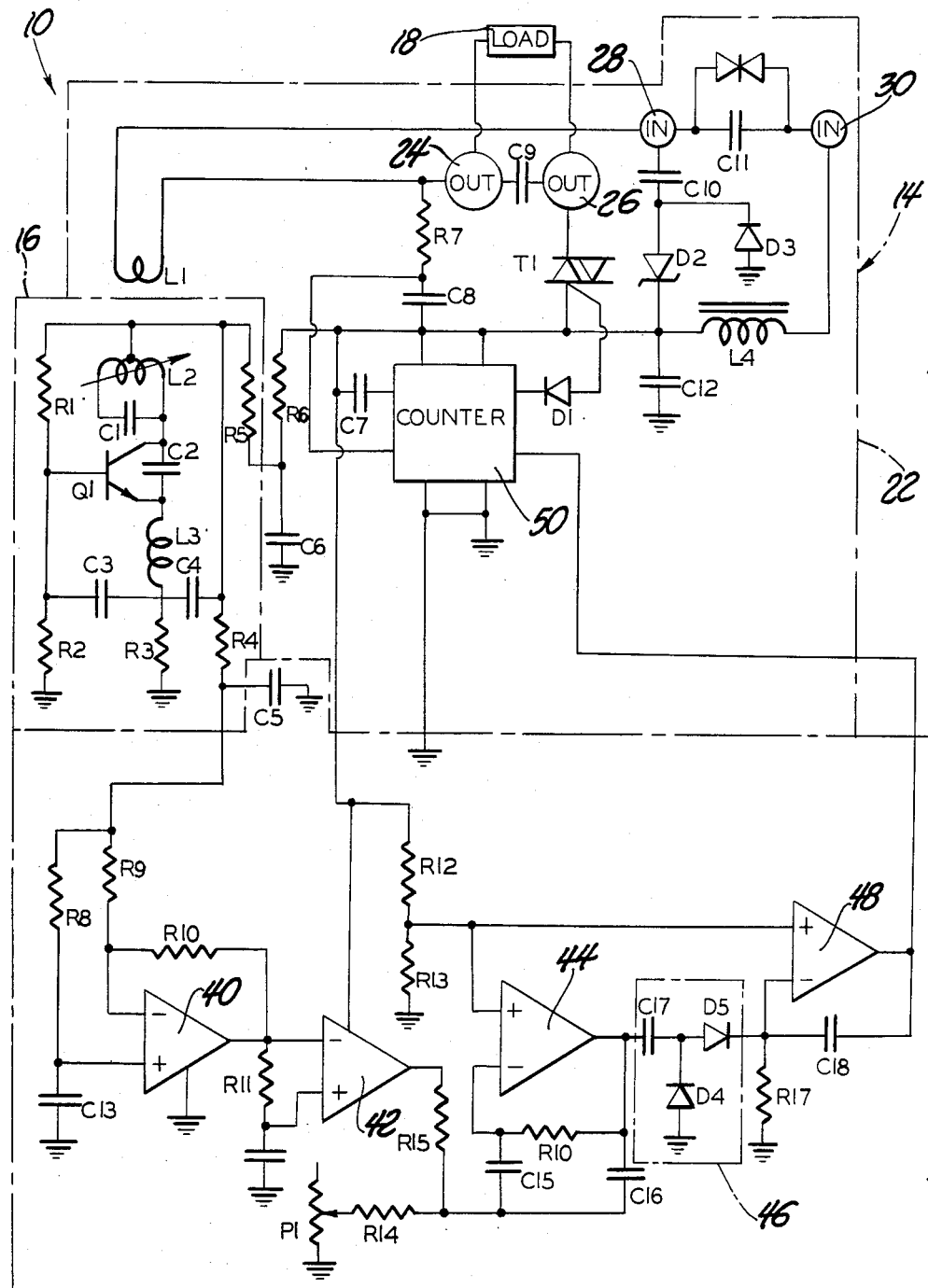
Figure 2:
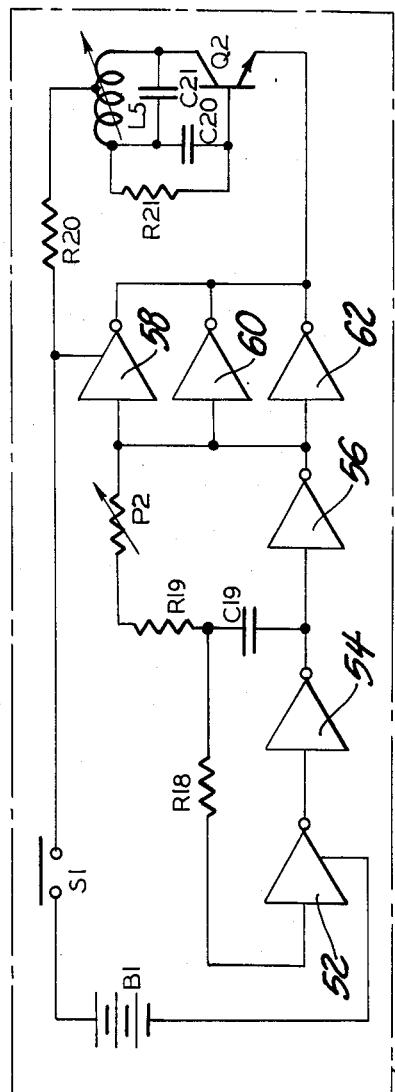

A remotely controlled dimmer switch or electrical power assembly is generally shown at 14 and 12 in FIGS. 1 and 2. The assembly 14, 12 supplies power to an electrical device or load 18 across power-out connectors 24, 26 requiring electrical power from a constant source. The circuit 14 comprises radio signal receiver means, generally indicated at 14, for electrically supplying power to an electrical load 18 in response to a predetermined radio signal. In other words, the assembly 14, 11 can be used with any device requiring power from a conventional electrical power source for electrically supplying power to the electrical load 18 in response to a predetermined radio signal. The assembly 12, 14 includes transmitter means 12 transmitting the predetermined radio signal to the receiver means 14 for remotely controlling the electrical power supplied to the electrical load 18. Put another way, the assembly 12, 14 includes transmitting means 12 for transmitting the predetermined radio signal to the receiver means 14 for varying the amount of the electrical power to the electrical load 18.

The radio signal receiver means 14 includes a super-generative detector 16 for receiving the predetermined radio signal, amplifier filter means 20 for amplifying and filtering the predetermined radio signal, and switch means 22 for opening and closing the receiver means 10 in response to a first duration of the predeterimed radio signal for supplying power to the electrical load 18 and for decreasing and increasing the power supply to the electrical load 18 in a series of stepped levels in response to a second duration of the predetermined radio signal. In other words, the switch means 22 acts similar to a variable resistor to decrease and increase the amount of power supplied to the electrical load 18 in a series of stepped levels.

The super-generative detector 16 receives the transmitted predetermined radio signal from a coupling antenna L1 which picks up the radio signals propagated by the transmitter means 12. The coupling antenna is connected to a coupling inductor L2 and a capacitor C1 to define a tuned circuit. A seventh super-generative transistor Q1 is connected to the tuned circuit L2-C1 and a feedback capacitor C2 and a second inductance L3 defining an isolation choke. A coupling capacitor C4 interconnects the coupling inductance L2 and the second inductance L3. An emitter resistor R3 interconnects the second inductance L3 and the electrical potential, in this case ground. A light capacitor C3 a second limiting and resistor R2 interconnect and the second inductance L3 and the electrical potential for setting the time constant for the quench rate for the super-generative transistor Q1. First and second biasing resistors R1 and R5 are for setting the bias on the super-generative transistor Q1.

The amplifier filter means 20 comprises an amplifier filter 40 connected to the super-generative detector 16 for amplifying the predetermined signal and filtering out unwanted noise. A limiter 42 limits the amplitude of the signal from the amplifier filter 40. A high-band pass filter 44 tunes the frequency of the signal from the limiter 42 by leaving the gain and band width of the signal constant. A threshold detector 46 limits the signal at full amplitude from the filter 44. A narrow band filter 48 filters out unwanted frequencies outside of the predetermined frequency of the signal from the detector 46.

The amplifier filter 40 comprises a first op-amp 40, ninth and tenth capacitors C5, C13 and three voltage divider resistors R8, R9, R10 for establishing a given closed loop gain. The limiter 42 connected to the amplifier filter 40 comprises a second op-amp 42, an eleventh capacitor C14, and a third limiting resistor R11. The high-band pass filter 44 connected to the limiter 42 comprises a third op-amp 44, a pair of capacitors C15, C16, five a series of resistors R12, R13, R14, R15, R16, and a first tuning or trim resistor P1 for tuning the frequency of the signal from the limiter 42. A detector 46 connected to the filter 44 comprises a pair of diodes D4, D5 and a twelfth capacitor C17 for limiting the signal at full amplitude from the third op-amp 44. The narrow band filter 48 connected to the detector 46 comprises a fourth op-amp 48, a thirteenth capacitor C18, and a fourth limiting resistor R17 for filtering out unwanted frequencies outside the predetermined frequency.

The switch means 22 comprises a counter 50 connected to the fourth op-amp 48 for counting up and down in response to the second duration of the predetermined radio signal and having memory capability for maintaining a given or determined amount of power to the electrical load 18 in response to the first duration of the predetermined radio signal. A triac T1 interconnects the counter 50 and the electrical load 18 acting as a switch which is either opend or closed.

Thus, a first duration (typically less than one second) of the predetermined radio signal will close the switch means 22 by having the counter 50 fire a gate pulse to the triac T1, causing the triac T1 to conduct. the counter 50 will "remember" a given level of power being supplied to the electrical load 18. The switch means 22 is opened by another first duration of the predetermined radio signal to the counter 50 by causing the counter 50 to fire or trigger another gate pulse to open the triac T1, which stops conducting and prevents current flow. If the switch means 22 is closed again, the counter 50 will supply power to the electrical load 18 the previous power level. Thus, the counter 50 remembers a given power level and supplies power at that given power level. Once the switch means 22 is closed, a second duration (typically two seconds) of the predetermined radio signal will cause the counter 50 to count up or down and increase or decrease the amount of current supplied to the electrical load 18. A third duration (typically four seconds) of the predetermined radio signal will reverse the direction of the counting, i.e., causing the counter 50 to count up if the counter 50 was counting down.

The switch means 22 further includes first and second power-out connectors 24, 26 are interconnected between the counter 50 and the electrical load 18 to provide power to the electrical load 18. A first diode D1 interconnects the triac T1 and a first counter 50. A first limiting resistor R7 and the capacitor C8 interconnect the first power-out connector 24 and the counter 50 for a counter reset. A seventh capacitor C7 interconnects the counter 50 and the eighth capacitor C8 to prevent triggering of the counter 50. A third capacitor C9 interconnects the first and second power out connectors 24, 26 to prevent shorting. The first and second power-in connectors 28, 30 supplies power from a constant source to the circuit 14. A fourth capacitor C11 interconnects the power-in connectors 28, 30 to prevent shorting. A blocking diode MOV interconnects the power-in connectors power-in connector 28, 30 to protect the circuit 14 against voltage surges from the constant power source. A first inductor L4 interconnects the second power-in connector 30 and the counter 50 to act as a filter for filtering out radio frequency interference. A zener diode fifth capacitor C10 interconnect the first power-in connector 28 and the first inductor L4 to limit the charge stored in the first inductor L4. A sixth capacitor C12 interconnects the zener diode D2 and the ground potential. The second diode D3 interconnects fifth capacitor C10 and the ground potential.

A transmitter means 12, as illustrated in FIG. 2, comprises a switch S1 for supplying power from a power source B1 through a limiting resistor R20 to a radio frequency oscillator and to an inverter network 52, 54, 56 combined with a pair of resistors R18, R19 and fourteenth capacitor C19, and second variable resistor P2 to define an audio frequency square-wave oscillator. The square wave from the audio frequency square-wave oscillator is applied through an inverter amplifier network 58, 60, 62. The square wave is supplied to a square-wave oscillator transistor Q2, the bias of which is controlled by the third biasing resistor R21. An inductance-capacitor network L5-C21 acts as a tuned circuit for the oscillator. A second coupling capacitor C20 interconnects the inductance-capacitor network L5-C21 and square-wave oscillator transistor Q2.

By way of example, and certainly not by way of limitation, the third embodiments of the circuits illustrated may include the following components.

|  | Value |
| --- | --- |
| RESISTORS | |
| Resistors | |
| R1 | 10K |
| R2 | 3.3K |
| R3 | 470 |
| R4 | 4.7K |
| R5 | 10K |
| R6 | 4.7K |
| R7 | 1 Meg |
| R8 | 10K |
| R9 | 10K |
| R10 | 1 Meg |
| R11 | 10K |
| R12 | 100K |
| R13 | 100K |
| R14 | 2.2K |
| R15 | 820K |
| R16 | 1.5 Meg |
| R17 | 1 Meg |
| R18 | 1 Meg |
| R19 | 220K |
| R20 | 4.7K |
| R21 | 220K |
| CAPACITORS | |
| Capacitors | |
| C1 | 2 picofarads |
| C2 | 3.3 picofarads |
| C3 | 560 picofarads |
| C4 | 100 picofarads |
| C5 | 4.7 microfarads |
| C6 | 100 microfarads |
| C7 | 47 microfarads |
| C8 | 1 microfarads |
| C9 | 100 picofarads |
| C10 | .3 microfarads |
| C11 | .1 microfarads |
| C12 | 100 microfarads |
| C13 | 3.3 microfarads |
| C14 | 3.3 microfarads |
| C15 | 4.7 microfarads |
| C16 | 4.7 microfarads |
| C17 | .47 microfarads |
| C18 | 10 microfarads |
| C19 | 4.7 microfarads |
| C20 | 5 picofarads |
| C21 | 2 picofarads |
| INDUCTORS | |
| Inductors | |
| L1 | electrical load |
| L2 | .39 microhenries |
| L3 | .39 microhenries |
| L4 | 100 microhenries |

-continued

| | Value |
|---|---|
| L5 | 100 microhenries |
| TRIM RESISTORS | |
| Trim Resistors | |
| P1 | 10K |
| P2 | 200K |
| OP-AMPS | |
| Op-Amps | |
| 40 | 324 |
| 42 | 324 |
| 44 | 324 |
| 48 | 324 |
| INVERTERS | |
| Inverters | |
| 52 | 4069 |
| 54 | 4069 |
| 56 | 4069 |
| 58 | 4069 |
| 60 | 4069 |
| DIODES | |
| Diodes | |
| D1 | IN 4004 |
| D2 | IN 4743A |
| D3 | IN 4004 |
| D4 | IN 4848 |
| D5 | IN 4148 |
| TRIAC | |
| Triac | |
| T1 | Q4006X41 |
| COUNTER | |
| Counter | |
| 50 | LSI 7232 |
| TRANSISTORS | |
| Transistor | |
| Q1 | 9018 |
| Q2 | 9018 |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience are not to be in any way limiting, the invention may be practiced otherwise than as specifically described.

What is claimed is:

1. A remotely controlled electrical dimmer assembly including a circuit (14) for supplying power to an electrical load (18) requiring electrical power from a constant source, said circuit (14) comprising; radio signal receiver means (14) for electrically supplying power in response to a predetermined radio signal, and including a super-generative detector (16) for receiving said predetermined radio signal, amplifier filter means (20) for amplifying and filtering said predetermined radio signal, switch means (22) for opening and closing said circuit (14) in response to a first duration of said predetermined radio signal for supplying power to said electrical load (18) and for decreasing and increasing the power supply to said electrical load (18) in a series of stepped levels in response to a second duration of said predetermined radio signal, a counter (50) for counting up and down in response to said second duration of said predetermined radio signal and having memory capability for maintaining a determined amount of power to the electrical load (18) in response to said first duration of said predetermined radio signal opening and closing said circuit (14) wherein said counter (50) produces said series of stepped levels with the number of said stepped levels being determined by said second duration, and a triac (T1) connecting said counter (50) and said load (18) for controlling the power to said load (18).

2. A remotely controlled electrical dimmer assembly including a circuit (14) for supplying power to an electrical load (18) requiring electrical power from a constant source, said circuit (14) comprising; radio signal receiver means (14) for electrically supplying power in response to a predetermined radio signal, and including a super-generative detector (16) for receiving said predetermined radio signal, amplifier filter means (20) for amplifying said predetermined radio signal, switch means (22) for opening and closing said circuit (14) in response to a first duration of said predetermined radio signal for supplying power to said electrical load (18) and for decreasing and increasing the power supply to said electrical load (18) in a series of stepped levels in response to a second duration of said predetermined radio signal, a counter (50) for counting up and down in response to said second duration of said predetermined radio signal and having memory capability for maintaining a determined amount of power to the electrical load (18) in response to said first duration of said predetermined radio signal opening and closing said circuit (10), wherein said switch means (22) includes a triac (T1) and a first diode (D1) interconnecting said electrical load (18) and said counter (50) for opening and closing said circuit (14), first and second power-out connectors (24, 26) interconnecting said electrical load (18) and said triac (T1) for providing power to said electrical load (18), a first limiting resistor (R7) and a first capacitor (C8) interconnecting said first power-out connector (24) and said counter (50) to reset said counter (50), a second capacitor (C7) interconnecting said counter (50) and said first capacitor (C8) to prevent triggering of said counter (50), a third capacitor (C9) interconnecting said first and second power-out connectors (24, 26) and preventing shorting of the electrical potentials, first and second power-in connectors (28, 30) supplying power from a constant source to said circuit, a fourth capacitor (C11) interconnecting said first and second power-in connectors (28, 30) and prevent shorting of the electrical potentials, a blocking diode (MOV) interconnecting said first and second power-in connectors (28, 30) and protecting said circuit against voltage surges from the power source, a first inductor (L4) interconnecting said second power-in connectoer (30) and said counter (50) for supplying power to said counter (50), zener diode (D2) and a fifth capacitor (C10) interconnecting said first power-in connector (28) and said first inductor (L4) for limiting the charge in said first inductor (L4), a sixth capacitor (C12) interconnecting said zener diode (D2) and the ground potential, and second diode (D3) interconnecting said fifth capacitor (C10) and the ground potential.

3. A circuit as set forth in claim 2 wherein said switch means (22) includes said triac (T1) and a first diode (D1) interconnecting said electrical load (18) and said counter (50) for opening and closing said circuit (10), first and second power-out connectors (24, 26) interconnecting said electrical load (18) and said triac (T1) for providing power to said electrical load (18), a first limiting resistor (R7) and an first capacitor (C8) interconnecting said first power-out connector (24) abd said counter (50) to reset said counter (50), a second capacitor (C7) interconnecting said counter (50) and said first capacitor (C8) to prevent triggering of said counter (50) a third capacitor (C9) interconnecting said first and second power-out connectors (24, 26) and preventing shorting of the electrical potentials, first and second power-in connectors (28, 30) supplying power from a constant source to said circuit, a fourth capacitor (C11) interconnecting said first and second power-in connectors (28, 30) and prevent shorting of the electrical potentials, a blocking diode (MOV) interconnecting said first and second power-in connectors (28, 30) and protecting said circuit against voltage surges from the power source, a first inductor (L4) interconnecting said second power-in connector (30) and said counter (50) for supplying power to said counter (50), zener diode (D2) and a fifth capacitor (C10) interconnecting said first power-in connector (28) and said first inductor (L4) for limiting the charge in said first inductor (L4), a sixth capacitor (C12) interconnecting said zener diode (D2) and the ground potential, and a second diode (D3) interconnecting said fifth capacitor (C10) and the ground potential.

4. A circuit as set forth in claim 3 wherein said super-generative detector (16) comprises; coupling antenna (L1) connected to a coupling inductor (L2) and a seventh capacitor (C1) defining a tuned circuit, a super-regenerative transistor (Q1) connected to said tuned circuit (L2-C1) and a feedback capacitor (C2) and a second inductance (L3) defining an isolation choke, a first coupling capacitor (C4) interconnecting said coupling inductor (L2) and said second inductance (L3), an emitter resistor (R3) interconnecting said second inductance (L3) and an electrical potential, an eighth capacitor (C3) and a second limiting resistor (R2) interconnecting said second inductance (L3) and said electrical potential for setting the time constant for the quench rate for said super-regenerative transistor (Q1), and first and second biasing resistors (R1, R5) for setting the bias on said super-regenerative transistor (Q1).

5. A circuit as set forth in claim 4 wherein said amplifier filter means (20) comprises an amplifier filter (40) connected to said super-generative detector (16) amplifying said predetermined signal and filtering out unwanted noise, limiter (42) limiting the amplitude of said signal from said amplifier filter (40), a high-band pass filter (44) tuning the frequency of said signal from said limiter (42) leaving the gain and band width of said signal constant, a threshold detector (46) connected to said high-band pass filter (44) limiting said signal from said high-band pass filter (44) at full amplitude, and a narrow band filter (48) connected to said detector (46) filtering out unwanted frequencies outside of said predetermined frequency of said signal from said detector (46).

6. A circuit as set forth in claim 5 wherein said amplifier filer (40) comprises; a first op-amp (40), ninth and tenth capacitors (C5, C13), and three voltage divider resistors (R8, R9, R10) for establishing a given closed-loop gain.

7. A circuit as set forth in claim 6 wherein said fourteenth limiter (42) comprises; eleventh op-amp (42), capacitor (C14), and third limiting resistor (R11).

8. A circuit as set forth in claim 7 wherein said high-band pass filter (44) comprises; a third op-amp (44), a pair of capacitors (C15, C16), a series of five resistors (R12, R13, R14, R15, R16), and a first tuning resistor (P1) tuning the frequency of said signal from said limiter (42).

9. A circuit as set forth in claim 8 wherein said detector (46) comprises; a pair of diodes (D4, D5) and a twelfth capacitor (C17) for limiting the signal at full amplitude from said high-band pass filter (44).

10. A circuit as set forth in claim 9 wherein said narrow band filter (48) comprises; a fourth op-amp (48), a thirteenth capacitor (C18), and a fourth limiting resistor (R17) for filtering out unwanted frequencies outside of said predetermined frequency.

11. A remotely controlled electrical dimmer assembly as set forth in claim 10 including transmitter means (12) for transmitting said predetermined radio signal to said receiver means (14) for remotely controlling the electrical power supply to an electrical load (18).

12. A remotely controlled electrical dimmer assembly as set forth in claim 11 wherein said transmitter means (12) comprises; a switch (S1) supplying power from a power supply (B1) through a fifth limiting resistor (R20) to a radio frequency oscillator and to an inverter network (52, 54, 56) combined with a pair of resistors (R18, R19), a fourteenth capacitor (C19), and a second tuning resistor (P2) to define an audio frequency square-wave oscillator, the square wave of which is applied to an inverter amplifier network (58, 60, 62), supplying square-wave current to a square-wave oscillator transistor (Q2) the bias of which is controlled by a third biasing resistor (R12) and combined with an inductance-capacitor network (L5-C21) acting as a tuned circuit for the oscillator and including a second coupling capacitor (C20).

* * * * *